United States Patent [19]

Jenks et al.

[11] Patent Number: 5,067,521
[45] Date of Patent: Nov. 26, 1991

[54] TWO-WAY REFRIGERATION VALVE WITH ELASTOMERIC SEAL

[75] Inventors: James K. Jenks, Clarklake; Russell V. Lyke, Jackson, both of Mich.

[73] Assignee: Refrigeration Sales, Inc., Jackson, Mich.

[21] Appl. No.: 644,254

[22] Filed: Jan. 22, 1991

[51] Int. Cl.⁵ .................................. F16K 11/044
[52] U.S. Cl. ...................... 137/625.5; 251/332; 251/366
[58] Field of Search ............. 137/625.5; 251/332, 251/366

[56] References Cited

U.S. PATENT DOCUMENTS

| | | | |
|---|---|---|---|
| 645,696 | 3/1900 | Topp | 137/625.5 X |
| 737,273 | 8/1903 | Reynolds | 137/625.5 X |
| 901,728 | 10/1908 | Newton | 137/625.5 X |
| 2,645,451 | 7/1953 | Gladden | 137/625.5 X |

Primary Examiner—Arnold Rosenthal
Attorney, Agent, or Firm—Beaman & Beaman

[57] ABSTRACT

A multiple port refrigeration circuit valve uses a valve head mounted upon a threaded stem to selectively control fluid flow through the valve. While the valve housing is formed of a plurality of parts assembled by heating the construction of the valve head permits an elastomeric seal to be used in combination with metal seal surfaces, and the use of the elastomer eliminates leakage and reduces the torque required to form an effective seal.

5 Claims, 1 Drawing Sheet

TWO-WAY REFRIGERATION VALVE WITH ELASTOMERIC SEAL

BACKGROUND OF THE INVENTION

Two-way valves are often utilized in refrigeration systems wherein a plurality of conduits, usually three, connect to the valve, and operation of the valve selectively permits the interconnecting of two of the conduits while closing flow through the third conduit. Such valves are usually of a concise configuration, generally tubular or cylindrical in form, are formed of two or more parts brazed together, and the valve body usually includes at least one threaded adapter of standard configuration for accepting a connector fitting utilizing a compression nut or the like and other adapters or conduit fittings may be brazed to the body at spaced locations to accommodate the several conduits associated with the valve.

Refrigeration valve bodies normally consist of at least two parts to permit assembly of the valve, fabrication of the adapters, and the like. The normal process of fabricating refrigeration valve bodies is to braze the valve body components together at high temperatures, and it is also common to braze adapters or other conduit coupling connectors to the valve body. As brazing assembly techniques require high heat, heretofore, it has not been possible to utilize elastomeric seals with two-way refrigeration valves as the elastomer is damaged by the heat required during assembly, and in the past, only metal-to-metal sealing between the valve body and the valve head has been available.

It is an object of the invention to provide a refrigeration valve of the two-way type wherein an elastomeric seal may be used with the valve, and dependable sealing characteristics achieved.

Another object of the invention is to provide a two-way refrigeration valve employing an elastomeric seal wherein previously experienced leakage problems with valves using metal-to-metal sealing have been substantially eliminated.

Another object of the invention is to provide a two-way refrigeration valve employing an elastomer wherein the torque required to achieve acceptable sealing is substantially reduced with respect to prior valve constructions.

Yet another object of the invention is to provide a two-way refrigeration valve which employs both elastomeric and metal-to-metal sealing.

A further object of the invention is to provide a two-way refrigeration valve of such construction that the valve parts may be separately plated prior to assembly and the plating reduces the occurrence of rust within the valve and its chamber.

In the practice of the invention a valve body consists of at least two parts which are adapted to be brazed into permanent connection. The valve body includes an internal chamber having conical metal sealing surfaces defined therein in an opposed spaced relationship, and a valve member having a threaded stem cooperating with a threaded bore formed in the valve body mounts the head within the chamber and permits positioning of the head between the chamber sealing surfaces.

The valve head includes a central region and conical sealing surfaces converging in a direction away from the central region, and the valve head central region includes a peripheral or circumferential groove in which an elastomeric seal is located. The elastomer seal in the preferred construction is of a T-configuration having a column received within the valve head groove, and a cross bar constituting the periphery of the valve head has ends which extend in radial direction beyond the associated valve head conical surface.

The construction of the valve head elastomer permits the elastomeric material to engage the valve body chamber sealing surfaces prior to the engagement of the adjacent chamber and valve head metal sealing surfaces. Accordingly, it is possible to achieve an acceptable seal with only an elastomeric material engagement with the metal valve body sealing surface. However, if optimum sealing is required it is possible to compress the elastomer to the extent that the metal sealing surface of the valve head directly engages the metal valve body chamber sealing surface simultaneously producing metal-to-metal engagement as well as elastomeric to metal contact.

One of the valve body chamber sealing surfaces is defined upon an adapter part of the valve body which is brazed to the primary valve body. Accordingly, the valve body chamber is only completely defined once the adapter part is brazed to the primary part. The fact that the adapter valve body part is in directly opposed relationship to the chamber other sealing surface permits the enlarged head of the valve member to be readily installed within the valve body chamber, and upon brazing of the adapter part to the primary part the opposed chamber sealing surfaces may be selectively engaged by the valve head elastomer and the metal conical sealing surfaces defined thereon.

As the elastomer is located upon the periphery of the valve head the elastomer is not damaged during the brazing of the adapter part to the primary valve part, or during other brazing, if the valve head is centrally located within the chamber so that the elastomer will not be in engagement with any of the valve body sealing or metal surfaces, but rather, is spaced therefrom. Accordingly, that heat which is transferred to the valve head through the valve member stem, or by radiation or convection, is not of such extent as to deleteriously affect the valve head elastomer. Likewise, the centering of the valve head within the valve body chamber during subsequent brazing operations on the valve body so as to add conduits or conduit adapters to the valve head will not destroy the sealing characteristics of the elastomer.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
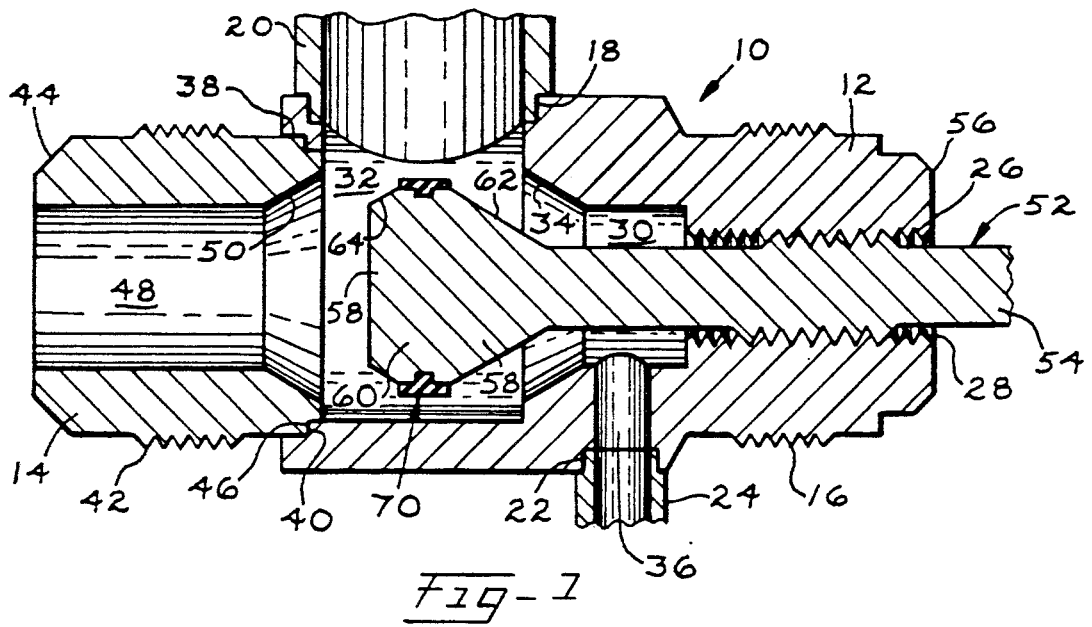
FIG. 1 is a diametrical elevational sectional view of a two-way refrigeration valve in accord with the invention, the valve head being centrally positioned within the valve body chamber.

With reference to FIG. 1, a two-way refrigeration valve in accord with the concepts of the invention is generally represented by reference 10. The valve body 10 consists of a primary part 12 and an adapter part 14 which is brazed to the primary part as later described. The part 12 includes a cylindrical extension upon which threads 16 are formed and a cap or the like, not shown, may be threaded upon threads 16. The part 12 also includes a cylindrical counterbore 18 to which the conduit adapter 20 may be brazed or otherwise affixed, and the part 12 also includes a counterbore 22 receiving a conduit adapter 24 as brazed thereto The primary part 12 includes an internal axial bore 26 coaxial with the longitudinal axis of the body part 12, and the bore 26 is threaded at 28. The bore 26 intersects a small annular chamber 30 which communicates with the primary part chamber 32 through the conical metal seal surface 34 defined of the material of the part 12. A passage 36 interconnects the smaller annular chamber 30 and the conduit adapter 24.

At its left end, as viewed in FIG. 1, the body part 12 is counterbored at 38 which defines the annular shoulder 40, both the counterbore 38 and shoulder 40 being concentric to the longitudinal axis of the part 12.

The body adapter part 14 includes threads 42 adapted to cooperate with a compression nut, not shown, defined on a conventional conduit end fitting capable of sealing with the standard adapter conical nose surface 44. The adapter part 14 also includes an annular shoulder 46 for engaging against the shoulder 40. A coaxial cylindrical bore 48 is defined in the part 14 which communicates with a conical metal seal surface 50 defined in the end of the adapter part 14. As will be readily appreciated from FIG. 1, when the adapter part 14 is assembled to the part 12 within the counterbore 38 the seal surface 50 will be concentric to the axis of the chamber 32 and seal surface 34, and the seal surfaces 34 and 50 will be in spaced opposed coaxial relationship to each other. Preferably, the converging angle of the surfaces 34 and 50 is identical.

The control of fluid flow through the body 10 is by operation of a valve member generally indicated at 52. The valve member includes a stem 54 having threads 56 which cooperate with the bore threads 28 defined in valve part 12. At its inner end the stem 54 supports a valve head 58 located within chamber 32, and the valve head includes a central region 60 defining the maximum diameter, and a conical seal surface 62 converging toward seal surface 34, and a conical seal surface 64 converging toward the adapter part seal surface 50. Preferably, the conical angles defined by the seal surfaces 34 and 62 are identical, as is the conical angle defined by seal surfaces 50 and 64.

The cylindrical periphery 66 of the valve head central region 60 includes an annular circumscribing groove or recess 68, and an annular elastomeric seal 70 encompasses the periphery of the valve head.

The elastomeric seal 70 formed of rubber or synthetic material is of a T-section cross section, and includes a column 72 and a cross bar 74. The cross bar 74 includes ends 76 and corner apices 78.

The elastomeric column 72 is closely received within the valve head recess 68 axially positioning the elastomeric seal 70 on the valve head, and as will be readily appreciated from the drawings, the radial thickness of the elastomeric cross bar 74 is such that the ends 76 axially project from the extension of the associated conical seal surfaces 62 and 64, and the seal surfaces' apices 78 are outwardly radially positioned with respect to the associated seal surfaces 62 and 64.

In fabricating a two-way refrigeration valve in accord with the invention, initially, the valve components 12, 14, 20, 24 and 52 are separately plated, including the internal bores and chambers, in order to protect the valve from interior or exterior rusting or corrosion.

Thereupon, the elastomeric seal 70 is placed upon the valve head 58 with the seal column 72 located within recess 68, and the valve member stem 54 is threaded into bore 26 through chamber 30. At its outer region the stem 54 may have a handle, or the like, not shown, attached thereto permitting the valve member to be manually rotated as desired.

The adapter part 14 is placed within its counterbore 38, and in a like manner the adapters 20 and 24 are located in their associated counterbores and these three components are brazed to the primary body part 12 in a conventional manner. Such brazing may take place in an oven, or by application of a torch flame or the like. Prior to brazing, the valve member stem 54 is rotated so as to locate the valve head and valve head central region in the axial center of the chamber 32, FIG. 1, in order to minimize the transfer of heat through the valve member to the elastomer seal 70.

As soon as brazing has been completed the assembled refrigeration valve is quenched to a room temperature to insure the integrity of the elastomer 70.

In use, conduits may be connected to the adapters 20 and 24, by brazing or threading, depending on the character of the adapters, and if heat is used the valve head 58 is to be centered within the chamber 32 prior to the application of heat to the valve body. Also, a conduit end fitting, not shown, may be attached to the adapter part 14 by threads 42 and nose surface 44 in the well known manner.

Figure 2:
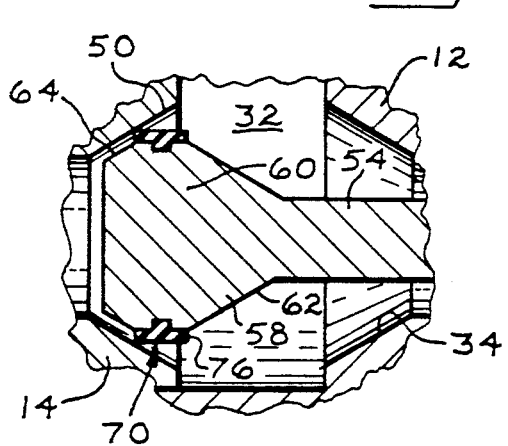
FIG. 2 is a detail diametrical sectional view illustrating the valve head elastomer in contact with the left chamber sealing surface of the valve illustrated in FIG. 1.
Figure 4:
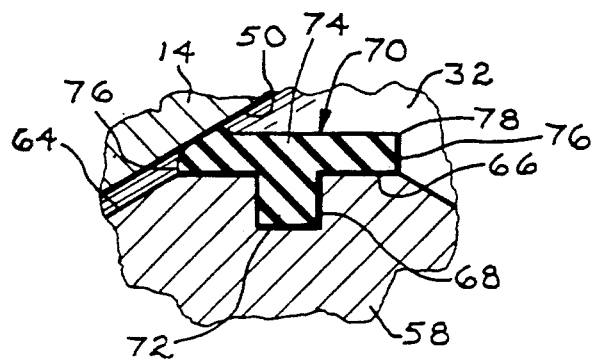
FIG. 4 is an enlarged detail elevational sectional view illustrating the engagement of the valve head elastomeric seal upon engaging the left chamber sealing surface.

After connection to the appropriate conduits, flow through the valve body 10 can selectively take place depending on the position of the valve head 58. For instance, if adapters 20 and 24 are to be in communication, and the conduits associated therewith, the stem 54 will be threaded to the left, FIGS. 1 and 2, such that the left end 76 and apex 78 of the elastomer 70 will engage the adapter seal surface 50 as shown in FIGS. 2 and 4. The engaged elastomer cross arm end 76 will engage the seal surface 50 and be deformed thereby as appreciated from FIG. 4. This engagement between surface 50 and the elastomer 70 will produce a fluid tight seal between the valve head and seal surface 50 permitting fluid flow through adapters 20 and 24, but preventing flow through adapter part 14.

Figure 3:
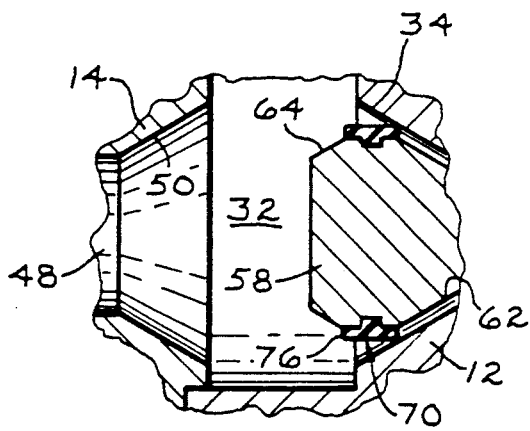
FIG. 3 is a detail elevational sectional view illustrating the valve head elastomer in engagement with the right chamber sealing surface.

If adapter part 14 is to communicate with adapter 20, the valve member stem 54 is threaded to position the valve head elastomer 70 against the seal surface 34 as shown in FIG. 3 and adapter part 14 and adapter 20 will now be in communication, and fluid flow through adapter 24 is prevented.

In the aforedescribed situations a fluid tight sealing between the valve head and the associated seal surface is achieved with low torque required on the valve member 50. With conventional metal-to-metal sealing high valve torques are often required to achieve effective sealing, and, often, 100% sealing is not possible even when the valve member is torqued to its maximum capability.

Figure 5:
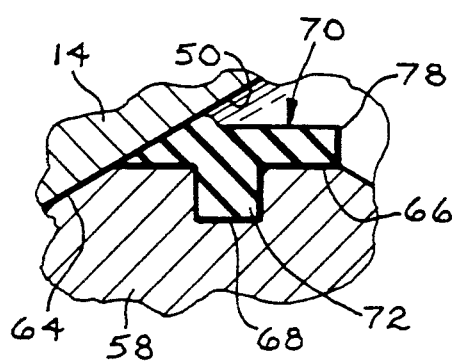
FIG. 5 is an elevational enlarged detail sectional view illustrating both the valve head elastomeric seal and metal sealing surface engaging the left chamber sealing surface.

With the two-way refrigeration valve of the invention it is possible to simultaneously achieve elastomeric-metal sealing and metal-to-metal sealing merely by tightening the valve member beyond that point necessary to achieve the elastomer-metal sealing shown in FIGS. 2-4. In such instance the elastomeric cross bar 74 will engage a seal surface, such as 50, FIG. 5, and deform as illustrated. The valve head 58 can continue to be translated to the left until fluid tight metal-to-metal engagement between complimentary conical seal surfaces 50 and 64 is achieved. In this manner a "double" sealing is provided.

From the above description, it will be appreciated that a two-way refrigeration valve in accord with the invention is capable of providing a fully leak proof flow path with a minimum valve member torque, and due to the fact that the valve parts can be plated both internally and externally, corrosion and rust can be eliminated. The refrigeration valve of the invention may be produced at low cost in volume, and the aforedescribed assembly procedures permit an elastomeric seal to be mounted upon the valve member head.

It is appreciated that various modifications to the inventive concepts may be apparent to those skilled in the art without departing from the spirit and scope of the invention.

What is claimed is:

1. A two-way refrigeration valve comprising, in combination, a metal body having an axis, first and second ends and a central region, a chamber defined within said body central region, a threaded bore coaxially defined in said body second end intersecting said chamber, a metal adapter coaxially brazed to said body part first end having an exterior surface, conventional fitting attachment means defined on said adapter exterior surface, said adapter directly communicating with said chamber and partially defining said chamber, a first port defined in said adapter in communication with said chamber at a first location, a second port defined in said body central region in communication with said chamber at a second location spaced from said first location, a third port defined in said body in communication with said chamber at a third location spaced from said first and second locations, said chamber having an axis coaxial with said body axis, a first conical metal chamber sealing surface defined on said body concentrically related to said chamber axis, a second conical metal chamber sealing surface define don said adapter concentrically related to said chamber axis in axially spaced opposed relation to said first sealing surface, said sealing surfaces partially defining said chamber and converging in a direction away from each other, said first and third locations intersecting said first and second sealing surfaces, respectively, said second location intersecting said chamber intermediate said first and second sealing surfaces, a valve member having a threaded stem received within said body threaded bore, said valve member including a head located within said chamber linearly movable substantially parallel to said chamber axis upon rotation of said stem, said valve head including a central portion having a central general plane substantially perpendicular to said chamber axis, first and second metal sealing surfaces defined on said head on opposite sides of said plane in opposed relation to said first and second chamber sealing surfaces, respectively, whereby said first head sealing surface is adapted to selectively engage with said first chamber sealing surface at one axial position of said valve head and said second head sealing surface is adapted to selectively engage with said second chamber sealing surface at a second axial position of said valve head, and an annular elastomeric seal band circumscribing said valve head central portion and radially extending beyond said first and second valve head sealing surfaces and axially extending beyond the adjacent projection of said sealing surfaces adapted to selectively sealingly engage with said first and second chamber seal surfaces prior to engagement of said first chamber and valve head sealing surfaces and said second chamber and valve head sealing surfaces, respectively.

2. A two-way refrigeration valve comprising, in combination, a metal body having an axis, first and second ends and a central region, a chamber defined within said body central region, a first port defined on said body first end in communication with said chamber at a first location, a second port defined on said body central region in communication with said chamber at a second location spaced from said first location, a third port defined on said body in communication with said chamber at a third location spaced from said first and second locations, said chamber having an axis and spaced opposed first and second metal chamber sealing surfaces concentrically related to said chamber axis, said first and third locations intersecting said first and second sealing surfaces, respectively, said second location intersecting said chamber intermediate said first and second sealing surfaces, a valve member movably mounted on said body including a head located within said chamber linearly movable substantially parallel to said chamber axis, said valve head including a central portion having a central general plane substantially perpendicular to said chamber axis, first and second metal sealing surfaces define don said head on opposite sides of said plane in opposed relation to said first and second chamber sealing surfaces, respectively, whereby said first head sealing surface is adapted to selectively engage with said first chamber sealing surface at one axial position of said valve head and said second head sealing surface is adapted to selectively engage with aid second chamber sealing surface at a second axial position of said valve head, and annular elastomeric seal means mounted on said valve head radially extending beyond said first and second valve head sealing surfaces adapted to selectively sealingly engage with said first and second chamber seal surfaces prior to engagement of said first chamber and valve head sealing surfaces and said second chamber and valve head sealing surfaces, respectively, said annular elastomeric seal means comprising an annular elastomeric band circumscribing said head central portion, said elastomeric band having a T cross sectional configuration having a column and a cross bar having ends, an annular recess defined in said head central portion, said band column being received within said recess and said cross bar ends, respectively, axially extending beyond the adjacent projection of said first and second valve head sealing surfaces.

3. In a refrigeration valve as in claim 2, said first and second sealing surfaces comprising conical surfaces converging away from said chamber and said first and second head sealing surfaces comprising conical surfaces converging away from said head central portion.

4. In a refrigeration valve as in claim 2, said valve member including a threaded stem, a threaded bore defined in said body coaxial with said chamber axis, said stem being threadedly received within said bore, said valve head being defined on said stem.

5. In a refrigeration valve as in claim 2, said body comprising at least first and second interconnected parts, said chamber being defined in said first part and said first port and said first chamber sealing surface being defined in said second part.

* * * * *